US010377919B2

(12) United States Patent
Bae et al.

(10) Patent No.: US 10,377,919 B2
(45) Date of Patent: Aug. 13, 2019

(54) HARD COATING FILM USING COMPOSITION INCLUDING EPOXY SILOXANE RESIN AND PREPARING METHOD THEREOF

(71) Applicant: Korea Advanced Institute of Science and Technology, Daejeon (KR)

(72) Inventors: Byeong-Soo Bae, Daejeon (KR); Gwang-Mun Choi, Daejeon (KR); Ji-Hoon Ko, Daejeon (KR)

(73) Assignee: KOREA ADVANCED INSTITUTE OF SCIENCE AND TECHNOLOGY, Yuseong-Gu, Daejeon (KR)

( * ) Notice: Subject to any disclaimer, the term of this patent is extended or adjusted under 35 U.S.C. 154(b) by 0 days.

(21) Appl. No.: 14/514,562

(22) Filed: Oct. 15, 2014

(65) Prior Publication Data
US 2015/0159044 A1 Jun. 11, 2015

(30) Foreign Application Priority Data
Dec. 11, 2013 (KR) .................. 10-2013-0154241

(51) Int. Cl.
*C08L 63/00* (2006.01)
*C09D 163/00* (2006.01)
*C08L 83/06* (2006.01)
*C09D 183/06* (2006.01)
*C08G 59/38* (2006.01)
*C09D 183/04* (2006.01)
*C08G 77/14* (2006.01)
*C08G 59/30* (2006.01)
*C08G 59/32* (2006.01)
*B05D 3/02* (2006.01)
*B05D 3/04* (2006.01)
*B05D 3/06* (2006.01)
*B05D 3/10* (2006.01)
*B05D 5/00* (2006.01)
*B05D 7/24* (2006.01)
*G02F 1/13* (2006.01)
*C08G 59/68* (2006.01)

(52) U.S. Cl.
CPC ....... *C09D 183/06* (2013.01); *C08G 59/3281* (2013.01); *C08G 59/38* (2013.01); *C08G 59/687* (2013.01); *C08L 63/00* (2013.01); *C09D 163/00* (2013.01); *C08G 77/14* (2013.01)

(58) Field of Classification Search
CPC .............. C08L 63/00–10; C08L 83/06; C09D 163/00–10; C09D 183/06; C09J 183/06; C08G 77/14; C08G 59/3281
See application file for complete search history.

(56) References Cited

U.S. PATENT DOCUMENTS

| 5,844,060 A | 12/1998 | Furuya et al. |
| 6,100,313 A * | 8/2000 | Treadway ............... C09D 4/00 522/170 |
| 6,391,999 B1 * | 5/2002 | Crivello ............... C07F 7/0852 525/477 |
| 6,498,200 B1 * | 12/2002 | Suzuki ................ C08G 59/68 522/13 |
| 7,452,945 B2 * | 11/2008 | Nixon ................ C09D 133/08 525/479 |
| 2006/0040113 A1 * | 2/2006 | Deruelle ............. C09D 183/06 428/447 |
| 2009/0232994 A1 * | 9/2009 | Ambrose ............... C09J 143/04 427/385.5 |
| 2012/0220681 A1 * | 8/2012 | Bae .................... C08G 59/3281 522/31 |
| 2013/0137795 A1 * | 5/2013 | Hara .................... C08G 77/14 523/400 |

FOREIGN PATENT DOCUMENTS

| CN | 1173191 A | 2/1998 |
| CN | 1279250 A | 1/2001 |
| CN | 1437632 A | 8/2003 |
| JP | 6327565 A | 2/1988 |
| JP | H0971654 A | 3/1997 |
| JP | 2004238484 A | 8/2004 |
| JP | 2005144699 A | 6/2005 |
| JP | 2005534774 A | 11/2005 |
| JP | 2010163601 A | 7/2010 |
| JP | 2011518666 A | 6/2011 |
| JP | 2011190413 A | 9/2011 |
| JP | 2012180463 A | 9/2012 |
| JP | 201382938 A | 5/2013 |
| JP | 2013108009 A | 6/2013 |

(Continued)

OTHER PUBLICATIONS

US Geological Survey, Water in the Atmosphere: The Water Cycle, (web page retrieved Oct. 3, 2016).*
Soucek et al., "Model for the Effects of Water on the Cationic UV-Curing of Cyclohexyl Epoxides," J. Coatings Technol. 75 (936), pp. 49-58 (2003).*
Suzuki Nobuo, "The Chemical Society of Japan, Experimental Chemistry course 29 polymeric materials", Sep. 25, 1993, pp. 322-323.
Japanese Industrial Standard, "Testing methods for paints", JIS K 5400-1990, Feb. 1, 1990, 9 pages.
Japanese Industrial Standard, Testing methods for paints—Part 5: Mechanical property of film—Section 4: Scratch hardness (Pencil method), JIS K 5400-5-4: 1999, Apr. 20, 1999, 12 pages.

(Continued)

*Primary Examiner* — Kregg T Brooks
(74) *Attorney, Agent, or Firm* — Hamre, Schumann, Mueller & Larson, P.C.

(57) ABSTRACT

The present disclosure relates to a hard-coating cured material which contains a siloxane resin component including an epoxy group and a preparing method of the hard-coating cured material. Especially, by using a special polymerization method like a cationic polymerization and a moisture-heat treatment, it is possible to provide a hard-coating film having both superior flexibility and high surface hardness that cannot be obtained from conventional coating compositions.

9 Claims, No Drawings

(56) References Cited

FOREIGN PATENT DOCUMENTS

| KR | 10-2004-0037081 A | 5/2004 | |
|---|---|---|---|
| KR | 1020120101245 A | 9/2012 | |
| KR | 1020130098553 A | 9/2013 | |
| WO | WO 2013059286 A1 * | 4/2013 | ........... C09D 183/06 |

OTHER PUBLICATIONS

Japanese Industrial Standard, "Testing methods for paints", JIS K 5400-1990, Feb. 1, 1990, 8 pages.
Designation: D 522-93a (Reapproved 2001), "Standard Test Methods for Mandrel Bend Test of Attached Organic Coatings", Nov. 1993, 4 pages.
Kanome Akira, "Total of 18 volumes of Plastic Technology", Silicone resin (6th copy) Jul. 15, 1971, 12 pages.
Shoichi Tanaka, "Hardness and Wear Resistance of Coating Films", Surface Technology Sep. 1990, vol. 41, No. 11, pp. 1105-1116.
Shin-Etsu Silicone Homepage Product Type "Silane Coupling Agents", https://www.shinetsusilicone-global.com/products/type/silanecoup/index.shtml, Jun. 30, 2017, 4 pages.
"Testing methods for paints—Part 5: Mechanical property of film—Section 4: Scratch hardness (Pencil method)" JIS K 5600-5-4, Apr. 20, 1999, 14 pages.
ASTM D522-93a, Standard Test Methods for Mandrel Bend Test of Attached Organic Coatings, ASTM International, West Conshohocken, PA, 2001, 4 pages.

* cited by examiner

HARD COATING FILM USING COMPOSITION INCLUDING EPOXY SILOXANE RESIN AND PREPARING METHOD THEREOF

CROSS-REFERENCE TO RELATED APPLICATION

This application claims the benefit of Korean Patent Application No. 10-2013-0154241 filed on Dec. 11, 2013, the entire disclosure of which is incorporated herein by reference.

TECHNICAL FIELD

The embodiments described herein pertain generally to a hard-coating film using a siloxane resin composition including an epoxy group and a preparing method of the hard-coating film.

BACKGROUND

A flexible display is a display device, which can be bent, folded or rolled like a paper, and being presently spotlighted for the next-generation display technology since it uses a plastic substrate, and not a glass substrate, and can be manufactured and utilized in light, unbreakable and various forms. Thus, if the flexible display is commercialized, it is expected that creation of a new area, to which the conventional display using a glass substrate could not have been applied, will be realized.

For the commercialization of the flexible display, a plastic substrate having strength, which can protect the interior of the display, and high surface hardness like the glass substrate is demanded. However, the plastic substrate has a drawback in that it has low surface hardness and inferior wear resistance due to the limit in the plastic material, compared to the glass. In order to overcome the drawback and commercialize the flexible display, the hard coating technique for improving the surface hardness of the plastic substrate is becoming an important issue.

Korean Patent Application Publication No. 10-2004-0037081 suggests a hard-coating film formed by stacking a hard-coating layer using a curable composition, which is cured by irradiation of an active energy ray, on at least one surface of a substrate film, a substrate, on which the hard-coating film is stacked, and a display device thereof. However, the hard-coating film is far less the high hardness of 9 H or higher in view of the pencil hardness of 4 H to 5 H, and there is no description of the flexibility of the hard-coating film. Further, there is no description of follow-up processes for increasing cross-linking density when the composition, which is cured by irradiation of the active energy ray, is cured.

Accordingly, a hard-coating film having the high surface hardness of 9 H or higher and sufficient flexibility enough to not be broken when it is bent or folded, and a preparing method thereof are expected to be core technique for the commercialization of the flexible display.

SUMMARY

In view of the foregoing, the present disclosure provides a hard-coating film having high flexibility and surface hardness by using a composition containing a siloxane resin including an epoxy group and a preparing method thereof.

However, the problems sought to be solved by the present disclosure are not limited to the above description and other problems can be clearly understood by those skilled in the art from the following description.

In accordance with a first aspect of the present disclosure, there is provided a preparing method of a hard-coating cured material, including: preparing a composition which contains a siloxane resin as Component A including an epoxy group and a cationic polymerization initiator as Component C, and initiating the cationic polymerization initiator as Component C in the composition to polymerize the composition, followed by a heat treatment.

In accordance with a second aspect of the present disclosure, there is provided a hard-coating cured material, prepared by the preparing method above.

In accordance with a third aspect of the present disclosure, there is provided a hard-coating film, including the hard-coating cured material.

In accordance with a fourth aspect of the present disclosure, there is provided a display device, including the hard-coating film.

The foregoing summary is illustrative only and is not intended to be in any way limiting. In addition to the illustrative aspects, embodiments, and features described above, further aspects, embodiments, and features will become apparent by reference to the drawings and the following detailed description.

In accordance with the foregoing example embodiments of the present disclosure, since the hard-coating film is formed by using a composition containing a siloxane resin including an epoxy group and controlling temperature and humidity conditions, it is possible to provide superior flexibility and high surface hardness such that the formed coating film is not broken even when it is bent or folded inward.

Especially, it is possible to provide a hard-coating film having both superior flexibility and high surface hardness that cannot be obtained from conventional coating compositions, by applying a special polymerization method, i.e., cationic polymerization and moisture-heat treatment, to a composition containing a siloxane resin including an epoxy group.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document of the present disclosure.

Throughout the whole document of the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Through the whole document of the present disclosure, the term "on" that is used to designate a position of one element with respect to another element includes both a case that the one element is adjacent to the another element and a case that any other element exists between these two elements.

In addition, through the whole document of the present disclosure, the term "comprises or includes" and/or "comprising or including" used in the document means that one or more other components, steps, operations, and/or the existence or addition of elements are not excluded in addition to the described components, steps, operations and/or elements.

The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

Through the whole document of the present disclosure the term "step of" does not mean "step for."

Through the whole document of the present disclosure the term "combination(s) of" included in Markush type description means mixture or combination(s) of one or more components, steps, operations and/or elements selected from a group consisting of components, steps, operation and/or elements described in Markush type and thereby means that the disclosure includes one or more components, steps, operations and/or elements selected from the Markush group.

Throughout the whole document of the present disclosure the description "A and/or B" means "A or B, or A and B."

Throughout the whole document of the present disclosure the term "alkyl group" may include a linear or branched $C_{1-7}$ alkyl group or $C_{1-20}$ alkyl group, and for example, may include, but not limited thereto, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosanyl, or possible isomers thereof.

Throughout the whole document of the present disclosure the term "alkenyl group" means a monovalent hydrocarbon group in the form that an alkyl group having two (2) or more carbons in the above-defined alkyl group has at least one carbon-carbon double bond, and may include, but not limited thereto, a linear or branched $C_{2-20}$ alkenyl group.

Throughout the whole document of the present disclosure the term "alkynyl group" means a monovalent hydrocarbon group in the form that an alkyl group having two (2) or more carbons in the above-defined alkyl group has at least one carbon-carbon triple bond, and may include, but not limited thereto, a linear or branched $C_{2-20}$ alkynyl group.

Throughout the whole document of the present disclosure the term "aryl group" means a monovalent functional group formed by removal of hydrogen atoms present in at least one ring of arene, and may include a $C_{6-20}$ aryl group. For example, the "aryl group" may include, but not limited thereto, phenyl, biphenyl, terphenyl, naphthyl, anthryl, phenanthryl, pyrenyl or possible isomers thereof. The arene is a hydrocarbon group having an aromatic ring, and includes a single- or multi-ring hydrocarbon group. The multi-ring hydrocarbon group includes at least one aromatic ring and may include an aromatic ring or a non-aromatic ring as an additional ring, but may not be limited thereto.

Throughout the whole document of the present disclosure the term "cycloalkyl group" is in the form of a monovalent functional group having a saturated hydrocarbon ring, and may include a $C_{3-8}$ cycloalkyl group. For example, the cycloalkyl group may include, but not limited thereto, cyclopropyl, cyclobutyl, cyclopentyl, cyclohexyl, cycloheptyl, cyclooctyl or possible isomers thereof.

Throughout the whole document of the present disclosure the term "alkoxy group" is in the form that the above-defined alkyl group and oxygen atoms are combined with each other, and may include a $C_{1-20}$ alkoxy group. For example, the alkoxy group may include, but not limited thereto, methoxy, ethoxy, propoxy, butoxy, pentoxy, hexyloxy, heptyloxy, octyloxy, nonyloxy, decyloxy, undecyloxy, dodecyloxy, tridecyloxy, tetradecyloxy, pentadecyloxy, hexadexyloxy, heptadecyloxy, octadecyloxy, nonadecyloxy, eicosanyloxy, or possible isomers thereof.

Hereinafter, example embodiments of the present disclosure are described in detail, but the present disclosure may not be limited thereto.

In accordance with a first aspect of the present disclosure, there is provided a preparing method of a hard-coating cured material, which includes: preparing a composition, which contains a siloxane resin as Component A including an epoxy group and a cationic polymerization initiator as Component C; and initiating the cationic polymerization initiator as Component C in the composition to polymerize the composition, followed by a heat treatment.

In accordance with an example embodiment of the present disclosure, the composition may further include, but not limited thereto, a reactive monomer as Component B including an alicyclic epoxy group, a glycidyl group or an oxetane group.

In accordance with an example embodiment of the present disclosure, the composition may be obtained by a process including mixing Components A and B, before mixing Components A and C, but may not be limited thereto. For example, when the composition containing Components A, B and C is prepared, a mixture composition of Components A and B may be first obtained by using Components A and B, and subsequently, the composition may be obtained by mixing the mixture composition of Components A and B with Component C. For example, when the composition containing Components A and C is prepared, the composition may be obtained by mixing Components A and C with each other.

In accordance with an example embodiment of the present disclosure, Component A may include, but not limited thereto, an average unit chemical formula represented by following Chemical Formula 1:

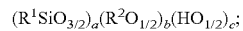     [Chemical Formula 1]

in Chemical Formula 1, $R^1$ includes a member selected from the group consisting of a substitutable linear or branched $C_{1-20}$ alkyl group, a substitutable linear or branched $C_{2-20}$ alkenyl group, a substitutable linear or branched $C_{2-20}$ alkynyl group, and a substitutable $C_{6-20}$ aryl group; and at least average 60% of $R^1$, includes a glycidyl group or a alicyclic epoxy group, a substituent, which may be substituted to $R^1$, includes a member selected from the group consisting of a linear or branched $C_{1-20}$ alkyl group, a $C_{3-8}$cycloalkyl group, a linear or branched $C_{1-20}$ alkoxy group, an amino group, an acryl group, a methacryl group, a halogen, an allyl group, a mercapto group, an ether group, an ester group, a carbonyl group, a carboxyl group, a vinyl group, a nitro group, a sulfonyl group, a hydroxyl group, a cyclobutenyl group, an alkyd group, an urethane group, an oxetane group, a phenyl group, an epoxy group, and combinations thereof, $R^2$ includes a linear or branched $C_{1-7}$ alkyl group, a is a positive number, b is a zero or positive number, c is a zero or positive number, and (b+c)/a is a number in a range of from 0 to 0.4.

In accordance with an example embodiment of the present disclosure, the epoxy group may be, but not limited thereto, a glycidyl group or an alicyclic epoxy group.

For example, when less than average 60% of $R^1$ includes a glycidyl group or an alicyclic epoxy group, curing density is reduced upon formation of the coating film so that sufficient surface hardness of the hard-coating film cannot be obtained.

In accordance with an example embodiment of the present disclosure, Component A may include, but not limited thereto, 1 or more to 10 or less units of $(R^1SiO_{3/2})$ in Chemical Formula 1. For example, when Component A includes 1 or more to 10 or less units of $(R^1SiO_{3/2})$, Component A may be, but not limited thereto, $(R^{1a}SiO_{3/2})_{aI}(R^2O_{1/2})_b(HO_{1/2})_c$, $(R^{1a}SiO_{3/2})_{aI}(R^{1b}SiO_{3/2})_{aII})(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^{1f}SiO_{3/2})_{aVI}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^{1f}SiO_{3/2})_{aVI}(R^{1g}SiO_{3/2})_{aVII}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^{1f}SiO_{3/2})_{aVI}(R^{1g}SiO_{3/2})_{aVII}(R^{1h}SiO_{3/2})_{aVIII}(R^2O_{1/2})_b(HO_{1/2})_c$, $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^{1f}SiO_{3/2})_{aVI}(R^{1g}SiO_{3/2})_{aVII}(R^{1h}SiO_{3/2})_{aVIII}(R^{1i}SiO_{3/2})_{aIX}(R^2O_{1/2})_b(HO_{1/2})_c$, or $(R^{1a}SiO_{3/2})_{aI}(R^{1b}SiO_{3/2})_{aII}(R^{1c}SiO_{3/2})_{aIII}(R^{1d}SiO_{3/2})_{aIV}(R^{1e}SiO_{3/2})_{aV}(R^{1f}SiO_{3/2})_{aVI}(R^{1g}SiO_{3/2})_{aVII}(R^{1h}SiO_{3/2})_{aVIII}(R^{1i}SiO_{3/2})_{aIX}(R^{1j}SiO_{3/2})_{aX}(R^2O_{1/2})_b(HO_{1/2})_c$. In Component A, each of $R^2$, b and c are the same as defined in Chemical Formula 1; each of $R^{1a}$, $R^{1b}$, $R^{1c}$, $R^{1d}$, $R^{1e}$, $R^{1g}$, $R^{1h}$, $R^{1i}$, and $R^{1j}$ are the same as $R^1$ defined in Chemical Formula 1; each of aI, aII, aIII, aIV, aV, aVI, aVII, aVIII, aIX and aX is a positive number, and the sum thereof in Component A is a; and a value obtained by dividing (b+c) by using the sum (i.e., a) of aI, a II, etc., in Component A is a number in a range of from 0 to 0.4.

When Component A includes, for example, four (4) different units of $(R^1SiO_{3/2})$, Component A may be represented by the chemical formula of $(R^{1a}SiO_{3/2})_{aI}(R^{1b}SiO_{3/2})_{aII}(R^{1c}SiO_{3/2})_{aIII}(R^{1c}SiO_{3/2})_{aIV}(R^2O_{1/2})_b(HO_{1/2})_c$, in which at least average 60% of total $R^1$ consisting of $R^{1a}$, $R^{1b}$, $R^{1c}$ and $R^{1d}$ at a ratio of aI:aII:aIII:aIV includes a glycidyl group or an alicyclic epoxy group; the sum of aI, aII, aIII and aIV is a; and (b+c)/(aI+aII+aIII+aIV) is a number in a range of from 0 to 0.4.

In accordance with an example embodiment of the present disclosure, Component A may be, but not limited thereto, one kind of an oligosiloxane, or a compound including two (2) or more to ten (10) or less different kinds of oligosiloxanes. For example, Component A may include a member formed by mixing two (2) or more kinds of oligosiloxanes of Chemical Formula 1, which have different compositions. Component A may include, but not limited thereto, one kind of an oligosiloxane; or a compound including two (2) kinds of oligosiloxanes, three (3) kinds of oligosiloxanes, four (4) kinds of oligosiloxanes, five (5) kinds of oligosiloxanes, six (6) kinds of oligosiloxanes, seven (7) kinds of oligosiloxanes, eight (8) kinds of oligosiloxanes, nine (9) kinds of oligosiloxanes, or ten (10) kinds of oligosiloxanes.

In accordance with an example embodiment of the present disclosure, Component A may be obtained by hydrolysis and condensation reaction of at least one kind of alkoxy silane represented by following Chemical Formula 2, but may not be limited thereto:

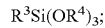  [Chemical Formula 2]

in Chemical Formula 2, $R^3$ includes a member selected from the group consisting of a substitutable linear or branched $C_{1-20}$ alkyl group, a substitutable linear or branched $C_{2-20}$ alkenyl group, a substitutable linear or branched $C_{2-20}$ alkynyl group, and a substitutable $C_{6-20}$ aryl group; a substituent, which may be substituted to $R^3$, includes a member selected from the group consisting of a linear or branched $C_{1-20}$ alkyl group, a $C_{3-8}$ cycloalkyl group, a linear or branched $C_{1-20}$ alkoxy group, an amino group, an acryl group, a methacryl group, a halogen, an allyl group, a mercapto group, an ether group, an ester group, a carbonyl group, a carboxyl group, a vinyl group, a nitro group, a sulfonyl group, a hydroxyl group, a cyclobutenyl group, an alkyd group, an urethane group, an oxetane group, a phenyl group, an epoxy group, and combinations thereof; $R^4$ includes a linear or branched $C_{1-7}$ alkyl group; and when Component A is prepared by the hydrolysis and condensation reaction of alkoxy silane represented by Chemical Formula 2 above, at least average 60% of $R^3$ of the total alkoxy silane includes a glycidyl group or alicyclic epoxy group.

As non-limiting examples, Component B is a reactive monomer that reduces viscosity of Component A so as to facilitate processability, and simultaneously, improve coating film characteristics such as coating adhesion, and may be, but not limited thereto, one kind of a reactive monomer, or a compound including two (2) or more kinds of reactive monomers having different characteristics.

Although an addition amount of Component B is not specifically limited, Component B needs to be added in approximately 40 or less parts by weight based on approximately 100 parts by weight of Component A so that the deterioration of the surface hardness of the hard coating cured material can be reduced. For example, the addition amount of Component B may be, but not limited thereto, approximately 40 or less parts by weight, approximately 30 or less parts by weight, approximately 20 or less parts by weights, approximately 10 or less parts by weight, or approximately 5 or less parts by weight based on approximately 100 parts by weight of Component A.

As non-limiting examples, the reactive monomer including an alicyclic epoxy group in Component B may include, but not limited thereto, at least one kind selected from the group consisting of 4-vinylcyclohexene dioxide, 4-vinylcyclohexene oxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, bis(3,4-epoxycyclohexylmethyl)adipate and so on, the reactive monomer including a glycidyl group in Component B may include, but not limited thereto, at least one kind selected from octylene oxide, p-butyl phenol glycidyl ether, butyl glycidyl ether, cresyl glycidyl ether, styrene oxide, allyl glycidyl ether, phenyl glycidyl ether, butadiene dioxide, divinylbenzene dioxide, diglycidyl ether, butanediol diglycidyl ether, limonene dioxide, vinylcyclohexene dioxide, diethylene glycol diglycidyl ether and so on, and the reactive monomer including an oxetane group in Component B may include, but not limited thereto, at least one kind selected from the group consisting of 3-methyloxetane, 2-methyloxetane, 3-oxetanol, 2-methyleneoxetane, 3-methyl-3-hydroxynnethyloxetane, 3-ethyl-3-hydroxymethyloxetane, 3,3-oxetanedimethanethiol, 2-ethylhexyloxetane, 4-(3-methyloxetane-3-yl)benzonitrile, N-(2,2-dimethylprophyl)-3-methyl-3-oxetanemethaneamine, N-(1,2-dimethylbutyl)-

3-methyl-3-oxetanemethaneamine, xylylene bisoxetane, 3-ethyl-3 [{(3-ethyloxetane-3-yl)methoxy}methyl]oxetane, (3-ethyloxetane-3-yl)methyl methacrylate, 4-[(3-ethyloxetane-3-yl)methoxy]butane-1-ol and so on.

Component C is a cationic polymerization initiator for polymerization of the alicyclic epoxy group, the glycidyl group or the oxetane group included in Component A or Components A and B. Although an addition amount of Component C is not specifically limited, Component C may be added, but not limited thereto, in an amount of from approximately 0.1 part by weight to approximately 10 parts by weight based on approximately 100 parts by weight of the Component A or mixture of Components A and B. For example, the addition amount of Component C may be, but not limited thereto, from approximately 0.1 parts by weight to approximately 10 parts by weight, from approximately 0.1 parts by weight to approximately 5 parts by weight, from approximately 0.1 parts by weight to approximately 1 part by weight, from approximately 0.1 parts by weight to approximately 0.5 parts by weight, from approximately 0.5 parts by weight to approximately 10 parts by weight, from approximately 1 part by weight to approximately 10 parts by weight, or from approximately 5 parts by weight to approximately 10 parts by weight, based on approximately 100 parts by weight of the Component A or mixture of Components A and B.

In accordance with an example embodiment of the present disclosure, the composition may further include, but not limited thereto, an additive selected from the group consisting of an antioxidant, an ultraviolet ray absorbent, a leveling agent, a hindered amine light stabilizer (HALS), a flow control agent and combinations thereof.

As non-limiting examples, the composition may be polymerized and cured so as to form the hard-coating cured material, and in this case, the composition may further include, but not limited thereto, an organic solvent to adjust the viscosity to be proper, and simultaneously, adjust the thickness of the cured material to be formed.

For example, the organic solvent may include, but not limited thereto, at least one kind selected from the group consisting of acetone, methylethylketone, methylbutylketone, methylisobutylketone, cyclohexanon, methylcellosolve, ethylcellosolve, cellosolveacetate, butylcellosolve, ethylether, dioxane, tetrahydrofuran, methyl acetate, ethyl acetate, propyl acetate, isopropyl acetate, butyl acetate, isobutyl acetate, pentyl acetate, isopentyl acetate, butanol, 2-butanol, isobutylalcohol, isopropylalcohol, dichloromethane, chloroform, dichloroethane, trichloroethane, tetrachloroethane, dichloroethylene, trichloroethylene, tetrachloroethylene, chlorobenzene, ortho-dichlorobenzene, n-hexane, cyclohexanol, methylcyclohexanol, benzene, toluene, and xylene.

In accordance with an example embodiment of the present disclosure, the initiation of Component C may be performed by light irradiation or heat treatment, but may not be limited thereto.

As non-limiting examples, when the light irradiation is used for the initiation of Component C, it is necessary to control the wavelength range and the quantity of light, and when the heat treatment is used, it is necessary to control the temperature range and the quantity of heat, to be proper for the characteristics of Component C, without being limited thereto.

As non-limiting examples, the cationic polymerization initiator is a material, which is initiated by the light irradiation or heat treatment to produce acid according to Brønsted-Lowry acid base definition or Lewis acid base definition, and any cationic polymerization initiator known in the art of the present disclosure can be used without limitation. For example, the cationic polymerization initiator may include, but not limited thereto, at least one kind selected from the group consisting of a 3-methyl-2-butenyltetramethylenesulfonium hexafluoroantimonate salt, a ytterbium(III) trifluoromethanesulfonate salt, a samarium(III) trifluoromethanesulfonate salt, an erbium(III) trifluoromethanesulfonate salt, a triarylsulfonium hexafluoroantimonate salt, a triarylsulfonium hexafluorophosphate salt, a lanthanum(III) trifluoromethanesulfonate salt, a tetrabutylphosphonium methanesulfonate salt, an ethyltriphenylphosphonium bromide salt, a diphenyliodonium hexafluoroantimonate salt, a diphenyliodonium hexafluorophosphate salt, a ditolyliodonium hexafluorophosphate salt, a 9-(4-hydroxy-ethoxyphenyl)thianthrenium hexafluorophosphate salt, and a 1-(3-methylbut-2-enyl)tetrahydro-1H-thiophenium hexafluoroantimonate salt.

As non-limiting examples, with respect to the light irradiation or the heat treatment conditions for the initiation of Component C, it is necessary to control the wavelength range and the quantity of light, or the temperature range and the quantity of heat, to be proper for the characteristics of Component C, but the present disclosure may not be limited thereto.

In accordance with an example embodiment of the present disclosure, the heat treatment may be performed by moisture-heat treatment, but may not be limited thereto. In this case, the heat treatment is performed after initiating Component C to polymerize the composition, and the hard-coating cured material may be formed by initiating Component C through light irradiation or heat treatment and performing moisture-heat treatment therefor, without being limited thereto.

If the special polymerization method, i.e., the moisture-heat treatment, is applied, the polymerization and curing processes by Component C for the alicyclic epoxy group, the glycidyl group or the oxetane group included in the composition are promoted so that the process time is significantly reduced, and furthermore, and the crosslinking density is increased so that the hard coating cured material having high surface hardness and excellent flexibility can be formed.

In accordance with an example embodiment of the present disclosure, the heat treatment that is performed after initiating Component C to polymerize the composition may be performed under the condition of a temperature of approximately 50° C. or higher and relative humidity of approximately 50% or higher (absolute humidity 41 g/m$^3$ or higher), but may not be limited thereto. For example, the temperature may be, but not limited thereto, approximately 50° C. or higher, approximately 60° C. or higher, approximately 70° C. or higher, approximately 80° C. or higher, approximately 90° C. or higher, or approximately 100° C. or higher, and the relative humidity may be, but not limited thereto, approximately 50% or higher, approximately 60% or higher, approximately 70% or higher, approximately 80% or higher, approximately 90% or higher, or approximately 95% or higher. The process may be performed under the condition of temperature and relative humidity that does not hinder the characteristics of the substrate, to which the coating film is applied, but may not be limited thereto.

In accordance with a second aspect of an example embodiment of the present disclosure, there is provided a hard-coating cured material, which is prepared by the preparing method according to the first aspect of the present disclosure.

In accordance with the preparing method of a hard-coating cured material according to the first aspect of the example embodiment, it is possible to obtain a hard-coating cured material having high surface hardness and superior flexibility, by using the composition containing a siloxane resin including an epoxy group.

In accordance with a third aspect of an example embodiment of the present disclosure, there is provided a hard-coating film, which includes the hard-coating cured material in accordance with the second aspect of the example embodiment.

As non-limiting examples, the hard-coating film including the hard-coating cured material may be formed after coating the composition on a substrate film, and polymerizing and curing the coating film, and in this case, the composition may further include an organic solvent in order to adjust the viscosity to be proper for the coating method, and simultaneously, adjust the thickness of the coating film to be formed to facilitate the coating property, without being limited thereto.

For example, the organic solvent may include, but not limited thereto, at least a member selected from the group consisting of acetone, methylethylketone, methylbutylketone, methylisobutylketone, cyclohexanone, methylcellosolve, ethylcellosolve, cellosolveacetate, butylcellosolve, ethylether, dioxane, tetrahydrofuran, methyl acetate, ethyl acetate, propyl acetate, isopropyl acetate, butyl acetate, isobutyl acetate, pentyl acetate, isopentyl acetate, butanol, 2-butanol, isobutylalcohol, isopropylalcohol, dichloromethane, chloroform, dichloroethane, trichloroethane, tetrachloroethane, dichloroethylene, trichloroethylene, tetrachloroethylene, chlorobenzene, ortho-dichlorobenzene, n-hexane, cyclohexanol, methylcyclohexanol, benzene, toluene, and xylene.

As non-limiting examples, the coating film may be formed on a substrate film, and for example, the substrate may include, but not limited thereto, at least one kind of resin selected from the group consisting of a polyester resin, a polyethylene terephthalate resin, a polyethylene resin, a polyvinyl chloride resin, a polyvinylidene chloride resin, a polypropylene resin, a polystyrene resin, a polyamide resin, an acrylonitrile butadiene styrene resin, a polycarbonate resin, a polyurethane resin, a polyimide resin, a phenolic resin, a polymethyl methacrylate resin, and a polyetherimide resin as an essential component of the substrate film.

The hard-coating film in accordance with the example embodiment of the present disclosure has high surface hardness and superior flexibility.

In accordance with a fourth aspect of the example embodiment, there is provided a display device including the hard-coating film in accordance with the third aspect of the example embodiment.

Since the hard-coating film in accordance with the example embodiment, which is prepared by using the siloxane resin composition including the epoxy group, has high surface hardness and superior flexibility, it can be easily applied to a flexible display device, which can be bent, rolled, or folded like a paper.

The second to fourth aspects of the present disclosure relate to the hard-coating cured material prepared by the above-described method according to the first aspect of the example embodiment, the hard-coating film and the display device including the hard-coating cured material respectively, and the detailed descriptions of the first aspect of the present disclosure can be applied to the second to fourth aspects of the present disclosure, even though they are omitted therein.

Hereinafter, example embodiments of the present disclosure are described in more detail with reference to Examples, but the present disclosure may not be limited thereto.

The chemical formula of Component A, which is described in the Examples below, is described as an average unit chemical formula, and CE is an abbreviation representing

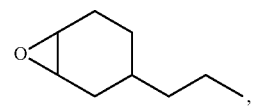

GP is an abbreviation representing

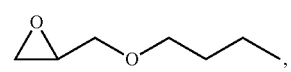

Ph is an abbreviation representing

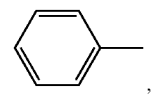

and Me is an abbreviation representing a methyl group.

EXAMPLES

Preparation Example 1

3-glycidoxypropyltrimethoxysilane (GPTS, the Gelest company) and water (H$_2$O, the Sigma-Aldrich company) were mixed at a ratio of 23.63 g:2.70 g (0.1 mol:0.15 mol) and injected in a 100 mL 2 neck flask. Thereafter, 0.05 mL ammonia was added to the mixture as a catalyst and stirred at 60° C. for 6 hours so that (GPSiO$_{3/2}$)$_1$(MeO$_{1/2}$)$_{0.06}$ was prepared.

Preparation Example 2

2-(3,4-epoxycyclohexyl)ethyltrimethoxysilane (ECTMS, the Gelest company) and water (H$_2$O, the Sigma-Aldrich company) were mixed at a ratio of 24.64 g:2.70 g (0.1 mol:0.15 mol) and injected in a 100 mL 2 neck flask. Thereafter, 0.05 mL ammonia was added to the mixture as a catalyst and stirred at 60° C. for 6 hours so that (CESiO$_{3/2}$)$_1$(MeO$_{1/2}$)$_{0.10}$ was prepared.

Preparation Example 3

3-glycidoxypropyltrimethoxysilane (GPTS, the Gelest company), trimethoxyphenylsilane (TMPS, the Gelest company) and water (H$_2$O, the Sigma-Aldrich company) were mixed at a ratio of 14.18 g:7.93 g:2.70 g (0.06 mol:0.04 mol:0.15 mol) and injected in a 100 mL 2 neck flask. Thereafter, 0.05 mL ammonia was added to the mixture as a catalyst and stirred at 60° C. for 6 hours so that (GPSiO$_{3/2}$)$_{0.6}$(PhSiO$_{3/2}$)$_{0.4}$(MeO$_{1/2}$)$_{0.10}$ was prepared.

Preparation Example 4

2-(3,4-epoxycyclohexyl)ethyltrimethoxysilane (ECTMS, the Gelest company), trimethoxyphenylsilane (TMPS, the Gelest company) and water ($H_2O$, the Sigma-Aldrich company) were mixed at a ratio of 14.78 g:7.93 g:2.70 g (0.06 mol:0.04 mol:0.15 mol) and injected in a 100 mL 2 neck flask. Thereafter, 0.05 mL ammonia was added to the mixture as a catalyst and stirred at 60° C. for 6 hours so that $(CESiO_{3/2})_{0.6}(PhSiO_{3/2})_{0.4}(MeO_{1/2})_{0.13}$ was prepared.

The average unit chemical formulas of each of Components A prepared by Preparation Examples 1 to 4 were identified through the $^{29}Si$-NMR (Nuclear Magnetic Resonance), $^{1}H$-NMR, and FT-IR (Fourier Transform Infrared Spectroscopy) analysis. For example, the ratio of a and (b+c) [a:(b+c)=$(T^0+T^1+T^2+T^3):(3*T^0+2*T^1+T^2)$] in Chemical Formula 1 is calculated by analyzing a ratio of classes $T^0$, $T^1$, $T^2$ and $T^3$ through $^{29}Si$-NMR. In addition, the ratio of b and c [b:c=alkoxy group:silanol group] in Chemical Formula 1 is calculated by analyzing contents of a silanol group and an alkoxy group of classes $T^0$, $T^1$ and $T^2$ through the $^{1}H$-NMR and FT-IR analysis. As described above, class "$T^n$ (n=0, 1, 2, and 3)" is a general method that indicates siloxane bonds in a siloxane resin, T means that there are three (3) Si—O bonds based on target silicone atoms, and n refers to the number of Si—O—Si bonds based on target silicone atoms. For example, class $T^0$ means that there are three (3) Si—O bonds based on target silicone atoms, but there is no Si—O—Si bond.

Example 1

Component A: $(GPSiO_{3/2})_1(MeO_{1/2})_{0.06}$;
Component B: Diglycidyl ether; and
Component C: Triarylsulphonium hexafluoroantimonate salt.

Component A obtained in Preparation Example 1 and Component B were mixed at weight ratios of 100:0, 100:10 and 100:30, independently, and 2 parts by weight of Component C was mixed based on 100 parts by weight of each of the mixtures so that three (3) kinds of compositions were prepared.

In the manner that the above compositions were coated on polyethylene terephthalate (PET) films, which had undergone surface treatment by oxygen plasma, and have a 80 μm thickness, to have a 50 μm thickness, four (4) identical samples for each of the three (3) kinds of the compositions were prepared. The total twelve (12) samples were exposed to mercury ultraviolet (UV) lamps (20 $mW/cm^2$) for 5 minutes to initiate Component C, and the 4 identical samples were subject to moisture-heat treatment under four (4) different conditions, i.e., a temperature of 25° C. and relative humidity of 85% (absolute humidity of 20 $g/m^3$), a temperature of 50° C. and relative humidity of 20% (absolute humidity of 17 $g/m^3$), a temperature of 50° C. and relative humidity of 50% (absolute humidity of 41 $g/m^3$), and a temperature of 85° C. and relative humidity of 50% (absolute humidity of 175 $g/m^3$), respectively, for 60 minutes so as to form the hard-coating film.

Example 2

Component A: $(CESiO_{3/2})_1(MeO_{1/2})_{0.10}$;
Component B: (3,4-epoxycyclohexyl)methyl 3,4-epoxycyclohexylcarboxylate; and
Component C: Triarylsulphonium hexafluoroantimonate salt.

Component A obtained in Preparation Example 2 and Component B were mixed at weight ratios of 100:0, 100:10 and 100:30, independently, and 2 parts by weight of Component C was mixed based on 100 parts by weight of each of the mixtures so that three (3) kinds of compositions were prepared.

In the manner that the above compositions were coated on polyethylene terephthalate (PET) films, which had undergone surface treatment by oxygen plasma, and have a 80 μm thickness, to have a 50 μm thickness, four (4) identical samples for each of the three (3) kinds of the compositions were prepared. The total twelve (12) samples were exposed to mercury ultraviolet (UV) lamps (20 $mW/cm^2$) for 90 seconds to initiate Component C, and the 4 identical samples were subject to moisture-heat treatment under four (4) different conditions, i.e., a temperature of 25° C. and relative humidity of 85% (absolute humidity of 20 $g/m^3$), a temperature of 50° C. and relative humidity of 20% (absolute humidity of 17 $g/m^3$), a temperature of 50° C. and relative humidity of 50% (absolute humidity of 41 $g/m^3$), and a temperature of 85° C. and relative humidity of 50% (absolute humidity of 175 $g/m^3$), respectively, for 60 minutes so as to form the hard-coating film.

Example 3

Component A: $(CESiO_{3/2})_1(MeO_{1/2})_{0.10}$;
Component B: 3-ethyl-3[{(3-ethyloxetane-3-yl)methoxy}methyl]oxetane; and
Component C: Triarylsulphonium hexafluoroantimonate salt.

Component A obtained in Preparation Example 2 and Component B were mixed at weight ratios of 100:0, 100:10 and 100:30, independently, and 2 parts by weight of Component C was mixed based on 100 parts by weight of each of the mixtures so that three (3) kinds of compositions were prepared.

In the manner that the above compositions were coated on polyethylene terephthalate (PET) films, which had undergone surface treatment by oxygen plasma, and have a 80 μm thickness, to have a 50 μm thickness, four (4) identical samples for each of the three (3) kinds of the compositions were prepared. The total twelve (12) samples were exposed to mercury ultraviolet (UV) lamps (20 $mW/cm^2$) for 90 seconds to initiate Component C, and the 4 identical samples were subject to moisture-heat treatment under four (4) different conditions, i.e., a temperature of 25° C. and relative humidity of 85% (absolute humidity of 20 $g/m^3$), a temperature of 50° C. and relative humidity of 20% (absolute humidity of 17 $g/m^3$), a temperature of 50° C. and relative humidity of 50% (absolute humidity of 41 $g/m^3$), and a temperature of 85° C. and relative humidity of 50% (absolute humidity of 175 $g/m^3$), respectively, for 60 minutes so as to form the hard-coating film.

Example 4

Component A: $(CESiO_{3/2})_1(MeO_{1/2})_{0.10}$;
Component B: 3-ethyl-3[{(3-ethyloxetane-3-yl)methoxy}methyl]oxetane; and
Component C: 1-(3-methylbut-2-enyl)tetrahydro-1H-thiophenium hexafluoroantimonate salt.

Component A obtained in Preparation Example 2 and Component B were mixed at weight ratios of 100:0, 100:10 and 100:30, independently, and 2 parts by weight of Component C was mixed based on 100 parts by weight of each of the mixtures so that three (3) kinds of compositions were prepared.

In the manner that the above compositions were coated on polyethylene terephthalate (PET) films, which had undergone surface treatment by oxygen plasma, and have a 80 μm thickness, to have a 50 μm thickness, four (4) identical samples for each of the three (3) kinds of the compositions were prepared. The total twelve (12) samples were exposed at the temperature of 100° C. for 30 minutes to initiate Component C, and the 4 identical samples were subject to moisture-heat treatment under four (4) different conditions, i.e., a temperature of 25° C. and relative humidity of 85% (absolute humidity of 20 g/m$^3$), a temperature of 50° C. and relative humidity of 20% (absolute humidity of 17 g/m$^3$), a temperature of 50° C. and relative humidity of 50% (absolute humidity of 41 g/m$^3$), and a temperature of 85° C. and relative humidity of 50% (absolute humidity of 175 g/m$^3$), respectively, for 60 minutes so as to form the hard-coating film.

Example 5

Component A: $(GPSiO_{3/2})_{0.6}(PhSiO_{3/2})_{0.4}(MeO_{1/2})_{0.10}$; and

Component C: triarylsulphonium hexafluoroantimonate salt.

2 parts by weight of Component C was mixed based on 100 parts by weight of Component A obtained in Preparation Example 3 so that one (1) kind of a composition was prepared.

In the manner that the above composition was coated on a PET film, which had undergone surface treatment by oxygen plasma and has a 80 μm thickness, to have a 50 thickness, four (4) identical samples were prepared. The total 4 samples were exposed to mercury UV (ultra violet) lamps (20 mW/cm$^2$) for 90 seconds to initiate Component C, and the 4 identical samples was subject to moisture-heat treatment under four (4) different conditions, i.e., a temperature of 25° C. and relative humidity of 85% (absolute humidity of 20 g/m$^3$), a temperature of 50° C. and relative humidity of 20% (absolute humidity of 17 g/m$^3$), a temperature of 50° C. and relative humidity of 50% (absolute humidity of 41 g/m$^3$), a temperature of 85° C. and relative humidity of 50% (absolute humidity of 175 g/m$^3$), respectively, for 60 minutes so as to form the hard-coating film.

Example 6

Component A: $(CESiO_{3/2})_{0.6}(PhSiO_{3/2})_{0.4}(MeO_{1/2})_{0.13}$; and

Component C: Triarylsulphonium hexafluoroantimonate salt.

2 parts by weight of Component C was mixed based on 100 parts by weight of Component A obtained in Preparation Example 4 so that one (1) kind of a composition was prepared.

In the manner that the above composition was coated on a PET film, which had undergone surface treatment by oxygen plasma and has a 80 μm thickness, to have a 50 μm thickness, four (4) identical samples were prepared. The total 4 samples were exposed to mercury UV (ultra violet) lamps (20 mW/cm$^2$) for 90 seconds to initiate Component C, and the 4 identical samples was subject to moisture-heat treatment under four (4) different conditions, i.e., a temperature of 25° C. and relative humidity of 85% (absolute humidity of 20 g/m$^3$), a temperature of 50° C. and relative humidity of 20% (absolute humidity of 17 g/m$^3$), a temperature of 50° C. and relative humidity of 50% (absolute humidity of 41 g/m$^3$), a temperature of 85° C. and relative humidity of 50% (absolute humidity of 175 g/m$^3$), respectively, for 60 minutes so as to form the hard-coating film.

In order to evaluate the surface hardness and the flexibility of the hard-coating film formed in accordance with the Examples, the following measurements were used:

Measurement 1: Pencil Hardness Test

In order to measure the surface hardness of the hard coating film formed in accordance with the Examples, the pencil hardness tester according to JIS K5600 was used, and Table 1 below provides the test results.

Measurement 2: Mandrel Bend Test

In order to evaluate the flexibility of the hard-coating film formed in accordance with the Examples, the Mandrel bend test according to ASTM D522-93a was used. The coated surface is bent inward based on the standard of 3.2 mm (0.125 inch) to identify occurrence of cracks on the coated surface, and Table 1 below provides the test results, which show ○ (no cracks) and X (occurrence of cracks).

TABLE 1

| | | Condition for Moisture-Heat Treatment: Temperature/Relative Humidity | | | | | | | |
|---|---|---|---|---|---|---|---|---|---|
| | | 25° C./85% | | 50° C./20% | | 50° C./50% | | 85° C./50% | |
| Examples | Component B* | Pencil Hardness (H) | Bend Test | Pencil Hardness (H) | Bend Test | Pencil Hardness (H) | Bend Test | Pencil Hardness (H) | Bend Test |
| 1 | 0 | 3 | ○ | 4 | ○ | 7 | ○ | 8 | ○ |
| | 10 | 3 | ○ | 4 | ○ | 6 | ○ | 7 | ○ |
| | 30 | 2 | ○ | 3 | ○ | 6 | ○ | 6 | ○ |
| 2 | 0 | 4 | ○ | 5 | ○ | 9 | ○ | 9 | ○ |
| | 10 | 4 | ○ | 5 | ○ | 8 | ○ | 9 | ○ |
| | 30 | 3 | ○ | 4 | ○ | 7 | ○ | 8 | ○ |
| 3 | 0 | 4 | ○ | 5 | ○ | 9 | ○ | 9 | ○ |
| | 10 | 4 | ○ | 5 | ○ | 8 | ○ | 9 | ○ |
| | 30 | 3 | ○ | 4 | ○ | 8 | ○ | 8 | ○ |
| 4 | 0 | 4 | ○ | 5 | ○ | 9 | ○ | 9 | ○ |
| | 10 | 4 | ○ | 5 | ○ | 8 | ○ | 9 | ○ |
| | 30 | 3 | ○ | 3 | ○ | 7 | ○ | 8 | ○ |
| 5 | 0 | 2 | ○ | 3 | ○ | 6 | ○ | 6 | ○ |
| 6 | 0 | 2 | ○ | 4 | ○ | 7 | ○ | 8 | ○ |

Component B*: Parts by weight of Component B based on 100 parts by weight of Component A As shown in Table 1 above, it could be identified that when the hard-coating film in accordance with the Examples is subject to the moisture-heat treatment under the condition of a temperature of 50° C. or higher and relative humidity of 50% or higher (absolute humidity of 40 g/m³ or higher), it exhibits excellent scratch resistance with the high surface hardness of at least 6 H and maximum 9 H, and it was identified through the Mandrel bent test that even though the coated surface is bent inward by using the 3.2 mm (0.125 inch) standard, it provides the flexible characteristic without occurrence of cracks on the coated surface.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A method of preparing a hard-coating cured material, comprising:
    preparing a composition which includes Component A comprising a siloxane resin including an epoxy group and Component C comprising a cationic polymerization initiator,
    initiating the Component C in the composition to polymerize the composition, and
    forming the hard-coating cured material by performing a moisture-heat treatment at a temperature of about 50° C. or higher and in a relative humidity condition of about 60% or higher,
    wherein the Component A is represented by the following average unit Chemical Formula 1:

 [Chemical Formula 1]

$(R^1SiO_{3/2})_a(R^2O_{1/2})_b(HO_{1/2})_c;$ wherein:
        $R^1$ includes a member selected from the group consisting of a substitutable linear or branched $C_{1-20}$ alkyl group, a substitutable linear or branched $C_{2-20}$ alkenyl group, a substitutable linear or branched $C_{2-20}$ alkynyl group, and a substitutable $C_{6-20}$ aryl group; and at least 60% of an average of $R^1$ includes a glycidyl group or alicyclic epoxy group,
        a substituent which may be substituted to $R^1$ includes a member selected from the group consisting of a linear or branched $C_{1-20}$ alkyl group, a $C_{3-8}$ cycloalkyl group, a linear or branched $C_{1-20}$ alkoxy group, an amino group, an acryl group, a methacryl group, a halogen, an allyl group, a mercapto group, an ether group, an ester group, a carbonyl group, a carboxyl group, a vinyl group, a nitro group, a sulfonyl group, a hydroxyl group, a cyclobutenyl group, an alkyd group, an urethane group, an oxetane group, a phenyl group, an epoxy group, and combinations thereof,
        $R^2$ includes a linear or branched $C_{1-7}$ alkyl group,
        a is a positive number,
        b is a zero or positive number,
        c is a zero or positive number, and
        (b+c)/a is a number in a range of from 0 to 0.4.

2. The method of claim 1,
    wherein the composition further includes Component B comprising a reactive monomer including an alicyclic epoxy group, a glycidyl group, or an oxetane group.

3. The method of claim 2,
    wherein the preparing the composition is performed by mixing the Component A with the Component B before mixing the Component A with the Component C.

4. The method of claim 1,
    wherein the epoxy group is a glycidyl group or alicyclic epoxy group.

5. The method of claim 1,
    wherein the Component A includes one type of oligosiloxane or two different types of oligosiloxanes.

6. The method of claim 1,
    wherein the Component A is prepared by hydrolysis and condensation reaction of at least one type of an alkoxysilane represented by the following Chemical Formula 2:

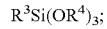 [Chemical Formula 2]

$R^3Si(OR^4)_3;$ wherein the Chemical Formula 2,
    $R^3$ includes a member selected from the group consisting of a substitutable linear or branched $C_{1-20}$ alkyl group, a substitutable linear or branched $C_{2-20}$ alkenyl group, a substitutable linear or branched $C_{2-20}$ alkynyl group, and a substitutable $C_{6-20}$ aryl group,
    a substituent which may be substituted to $R^3$ includes a member selected from the group consisting of a linear or branched $C_{1-20}$ alkyl group, a $C_{3-8}$ cycloalkyl group, a linear or branched $C_{1-20}$ alkoxy group, an amino group, an acryl group, a methacryl group, a halogen, an allyl group, a mercapto group, an ether group, an ester group, a carbonyl group, a carboxyl group, a vinyl group, a nitro group, a sulfonyl group, a hydroxyl group, a cyclobutenyl group, an alkyd group, an urethane group, an oxetane group, a phenyl group, an epoxy group, and combinations thereof,
    $R^4$ includes a linear or branched $C_{1-7}$ alkyl group, and
    at least 60% of an average of $R^3$ of the total alkoxysilane includes a glycidyl group or alicyclic epoxy group.

7. The method of claim 1,
    wherein the composition further includes an additive agent selected from the group consisting of an antioxidant, an ultraviolet absorbing agent, a leveling agent, a hindered amine light stabilizer (HALS), a flow control agent, and combinations thereof.

8. The method of claim 1, wherein the initiation of the Component C is performed by a light irradiation or a heat treatment.

9. The method of claim 1, wherein the hard-coating cured material has a pencil hardness of at least 6 H and maximum 9 H.

* * * * *